US012625058B2

(12) United States Patent (10) Patent No.: US 12,625,058 B2

Huhtanen et al. (45) Date of Patent: May 12, 2026

(54) METHOD AND APPARATUS FOR CONTROLLING CELLULOSE PROCESSING

(71) Applicant: VALMET AUTOMATION OY, Espoo (FI)

(72) Inventors: Juha-Pekka Huhtanen, Tampere (FI); Ismo Joensuu, Oulu (FI); Juha Ojanen, Valkeakoski (FI)

(73) Assignee: VALMET AUTOMATION OY, Espoo (FI)

( * ) Notice: Subject to any disclaimer, the term of this patent is extended or adjusted under 35 U.S.C. 154(b) by 594 days.

(21) Appl. No.: 18/087,246

(22) Filed: Dec. 22, 2022

(65) Prior Publication Data

US 2023/0204489 A1      Jun. 29, 2023

(30) Foreign Application Priority Data

Dec. 23, 2021      (FI) ...................................... 20216345

(51) Int. Cl.
| | |
|---|---|
| *G01N 15/14* | (2024.01) |
| *C08B 1/00* | (2006.01) |
| *G01N 15/149* | (2024.01) |

(52) U.S. Cl.
CPC ........... *G01N 15/1459* (2013.01); *C08B 1/00* (2013.01); *G01N 15/149* (2024.01); *G01N 2015/1493* (2013.01)

(58) Field of Classification Search
CPC ............. G01N 15/1459; G01N 15/149; G01N 2015/1493; G01N 15/075;

(Continued)

(56) References Cited

U.S. PATENT DOCUMENTS

| | | | | |
|---|---|---|---|---|
| 5,087,823 | A | | 2/1992 | Silvy et al. |
| 5,500,735 | A | * | 3/1996 | Bentley ................ G01N 33/343 |
| | | | | 356/246 |

(Continued)

FOREIGN PATENT DOCUMENTS

| | | |
|---|---|---|
| RU | 2 067 638 C1 | 10/1996 |
| WO | 2018/146379 A1 | 8/2018 |
| WO | 2020/244938 A1 | 12/2020 |

OTHER PUBLICATIONS

Jun. 13, 2023 Office Action issued in Swedish Patent Application No. 2251454-1.

(Continued)

*Primary Examiner* — Abbas Rashid
*Assistant Examiner* — Elisa H Vera
(74) *Attorney, Agent, or Firm* — Oliff PLC

(57) ABSTRACT

A solution for controlling cellulose processing comprises performing (200) optically first measurements of the cellulose during the processing, performing (202) second measurements of the cellulose by directing (204) optical radiation to the cellulose, the radiation comprising at least one beam that is polarized and at least one separate beam is non-polarized, measuring (206) attenuations and parameters of polarization of the radiation interacted with the cellulose and determining size of particles in the cellulose based on at least one comparison of the parameters of polarization and the attenuations. The processing is controlled (208) based on the first measurements until a given threshold of the first measurements has been reached and thereafter controlling the processing based on the second measurements.

12 Claims, 7 Drawing Sheets

(58) Field of Classification Search
CPC ... G01N 2015/0057; G01N 2015/0294; G01N
15/0205; G01N 15/0227; G01N 33/343;
G01N 15/02; G01N 21/59; G01N 21/85;
G01N 21/21; D21D 1/002; D21C 3/00;
C08B 1/00
See application file for complete search history.

(56) References Cited

U.S. PATENT DOCUMENTS

| | | |
|---|---|---|
| 2003/0030005 A1 | 2/2003 | Karki et al. |
| 2016/0376749 A1* | 12/2016 | Lim ........................ C08B 15/00 |
| | | 162/70 |
| 2020/0407912 A1* | 12/2020 | Okawa ................... D21H 11/18 |
| 2021/0214893 A1 | 7/2021 | Törmänen |

OTHER PUBLICATIONS

Jul. 14, 2022 Office Action and Search Report issued in Finnish
Patent Application No. 20216345.

\* cited by examiner

METHOD AND APPARATUS FOR CONTROLLING CELLULOSE PROCESSING

FIELD

The invention relates to cellulose processing and especially controlling cellulose processing.

BACKGROUND

Microfibrillar cellulose refers to cellulose microfibrils or microfibril bundles separated from lignocellulose-containing fibre raw material, such as wood material. Microfibrillar cellulose is characterized by a large specific surface area and a strong ability to form hydrogens bonds. In water dispersion, micro-fibrillar cellulose appears as colourless, gel-like material. Microfibrillar cellulose may be utilized for example as an additive in manufacturing of new biobased products.

Typically, the producing of microfibrillar cellulose by refining involves a high-degree grinding, i.e. a high-degree refining, of the lignocellulose-containing fibre material. The grinding or refining generally refers to comminuting material mechanically by work applied to material particles, which work may be grinding, refining, crushing or shearing, or any combination of these, or another corresponding action to reduce the particle size. The refining is performed at a low consistency of a mixture of the fibre material and water, called also for example fibre suspension, fibre pulp or pulp. In addition to this mechanical treatment of the ligno-cellulose-containing fibre material, the producing of micro-fibrillar cellulose may also comprise chemical or enzymatic processing of the lignocellulose-containing fibre material.

A problem relating to the producing of microfibrillar cellulose by re-fining is an excessive amount of energy used in the refining. Energy taken by the refining is typically expressed in terms of energy per processed raw material quantity, typical unit being kWh/T, i.e. kWh/ton, or a unit proportional to that. As said above, microfibrillar cellulose is gel-like material, thereby having a high apparent viscosity because of which frictional forces affecting in blade elements of a refiner are very high and which, in turn, causes a high energy consumption in the producing of the nanofi-brillar cellulose. The high energy consumption increases production costs of the microfibrillar cellulose and thereby for example limits applications of the microfibrillar cellulose that are economically feasible. Thus, there is a need for improvement.

BRIEF DESCRIPTION

The present invention seeks to provide an improvement in controlling cellulose processing.

According to an aspect of the present invention, there is provided a method of claim 1.

According to an aspect of the present invention, there is provided an apparatus of claim 11.

In an embodiment, the cellulose is processed mechanically by refining the cellulose in a refiner between a set of refiner segments and the processing is controlled by adjusting the gap between the refiner segments and/or the time of process and/or revolutions per minute of the refiner segments.

In an embodiment, the cellulose is processed chemically, and the processing is controlled by adjusting the amount and type of chemicals and/or enzymes used in the process and/or the temperature and/or time used in the processing.

In an embodiment, the cellulose is processed with micro fluidizer and the processing is controlled by adjusting the pressure of the micro fluidizer.

In an embodiment, the cellulose is processed with homog-enizer and the processing is controlled by adjusting the pressure of the fluid.

In an embodiment, the cellulose is processed with a disperser, and the processing is controlled by adjusting the gap between the disperser segments and/or the time of process or revolutions per minute of the segments.

LIST OF DRAWINGS

Example embodiments of the present invention are described below, by way of example only, with reference to the accompanying drawings, in which FIG. 1 shows schematically a cellulose processing arrangement for producing microfibrillar cellulose;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain features/structures that have not been specifically men-tioned. All combinations of the embodiments are considered possible if their combination does not lead to structural or logical contradiction.

It should be noted that while the figures illustrate various embodiments, they are simplified diagrams that only show some structures and/or functional entities. The connections shown in the figures may refer to logical or physical con-nections. It is apparent to a person skilled in the art that the described apparatus may also comprise other functions and structures than those described in the figures and text. It should be appreciated that details of some functions, struc-tures, and the signalling used for measurement and/or con-trolling are irrelevant to the actual invention. Therefore, they need not be discussed in more detail here. As a consequence of current pulping practices, the extractive-rich pulp fines fractions are not retained in chemical or mechanical pulping processes and hence the pulp product is not pure and uniform in terms of particle size and chemical composition, for example. Some of the particles within the fines category may be almost inert to chemical reactions by the pulping and bleaching chemicals. Most typical examples of this include the fines and other particles from bark, knots, resin canals or secreted heartwood that have a high content of extractives and resin and fatty acid compounds in comparison to the conventional cellulosic plant cells i.e. tracheid cells and vessel elements, and biomass such as straw, orange skins, etc. In industrial setting, these are all conventionally considered as fibres.

Figure 1:
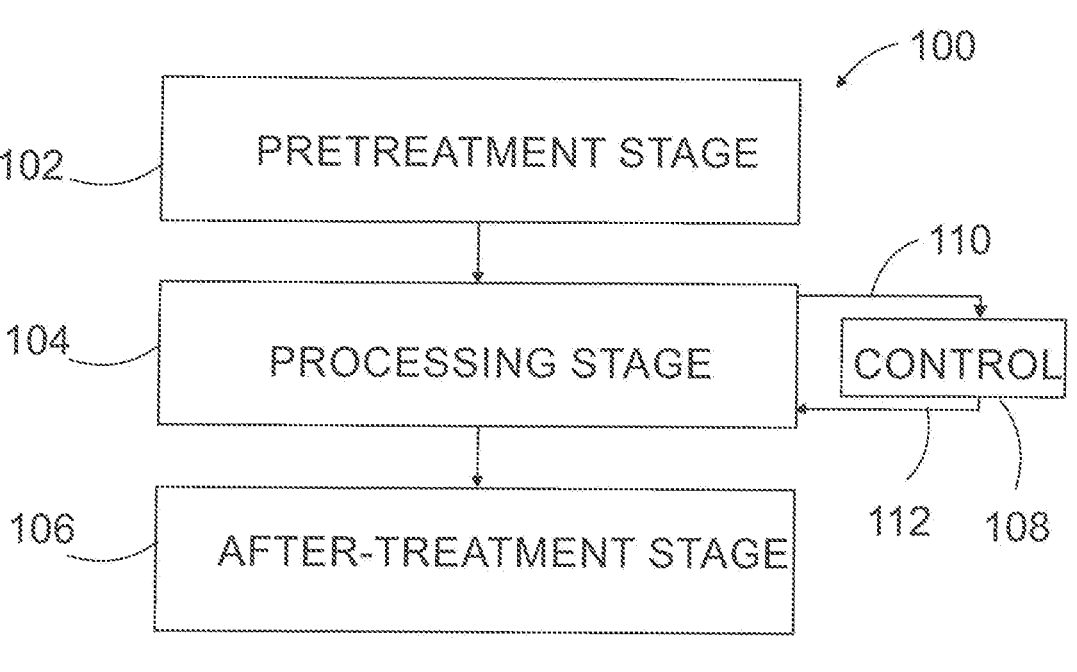

FIG. 1 shows schematically an example of an arrangement 100 for cellulose processing producing microfibrillar cellulose (MFC). Microfibrillar cellulose refers to cellulose nanofiber comprising multiple elementary fibers with crystalline and amorphous regions, having an aspect ration with width from 10 to 100 nm and length of 0.5 to 10 um. Often used synonyms for the microfibrillar cellulose are for example microfibrillar cellulose (MFC) or microfibrillated cellulose or cellulose microfibrils, nanocrystal cellulose (NCC), microcrystal cellulose (MCC) and cellulose microcrystal (CMC).

Microfibrillar cellulose has many properties that enhance the properties of products utilising cellulose when microfibrillar cellulose is utilized as in cellulose. For example, the use of microfibrillar cellulose as an additive material when manufacturing boxes made from corrugated cardboard increases the strength of the cardboard and makes the final product mode durable. Therefore, the use of microfibrillar cellulose is increasing.

The cellulose processing arrangement 100 for producing microfibrillar cellulose comprises a pre-treatment stage 102, a processing stage 104, and an after-treatment stage 106.

The arrangement 100 further comprises a controller 108 controlling the processing stage 104. The controller may receive information 110 on the process in the processing stage 104 and provide control 112 of refining.

In an embodiment, the pre-treatment stage 102 comprises a preparation of fibre suspension, i.e. fibre pulp or pulp, from the lignocellulose-containing fibre raw material by mixing the lignocellulose-containing fibre raw material and water. The fibre raw material used for producing microfibrillar cellulose is typically virgin fibre material, such as bleached chemical pulp. The preparation of the fibre suspension may thus for example comprise at least one pulper for slushing the lignocellulose-containing fibre raw material such that a substantially low consistency of the fibre suspension to be supplied further into the processing stage 3 is achieved. The consistency of the fibre suspension is typically not more than 6%, preferably about 3% to 5%. In case of the lignocellulose-containing fibre raw material to be used for producing microfibrillar cellulose being something else than bleached chemical pulp, the fibre raw material may have to be purified. Therefore, the pre-treatment stage 102 may comprise various kind of purification apparatuses. Additionally, different kind of additives, such as enzymes and/or chemicals, may be added into the fibre suspension at the pre-treatment stage 102. Also, a dilution phase may be included for diluting the fibre suspension to have a desired consistency.

In an embodiment, the lignocellulose-containing fibre material suspension is supplied from the pre-treatment stage 102 to the processing stage 104. The processing stage 104 comprises at least one refiner, i.e. one or more refiners. Generally, in refining, an intention is to subject a processing or treatment effect, i.e. a refining effect, to the lignocellulose-containing fibre material in order to affect the fibre properties and/or fibre length in the fibre material to be refined.

There are various ways of realising the processing or treatment effect. In an embodiment, the cellulose is processed mechanically by refining the cellulose in a refiner between a set of refining segments. In an embodiment, the cellulose is processed chemically using different chemicals and/or enzymes. In an embodiment, the cellulose is processed with micro fluidizer. In an embodiment, the cellulose is processed with a homogenizer.

In an embodiment, the processing stage 104 comprises one refiner and the fibre material to be refined is subjected to the refining effect in this single refiner number of times, i.e. one or more times, when producing microfibrillar cellulose. The fibre material already refined at least once by the refiner may thus be recirculated at least once through this single refiner when producing microfibrillar cellulose.

In an embodiment, the processing stage 104 comprises at least one series of refiners, each series of refiners comprising at least two successive refiners connected in series relative to each other. The refiners in the series of refiners may have similar or different refining characteristics, for example refining surface properties in case of mechanical processing. The fibre material to be refined is subjected to the refining effect in each series of refiners at least once in each refiner. In other words, the fibre material to be refined is subjected to the refining effect at least the number of times corresponding to the number of refiners in the series of the refiners. The fibre material having passed through the series of the refiners at least once may also be recirculated at least once through this series of refiners when producing microfibrillar cellulose.

In an embodiment, the processing stage 104 may comprise two or more single refiners arranged in parallel relative to each other, or two or more series of at least two refiners arranged in parallel relative to each other.

The fibre material to be refined is refined in the processing stage 104 as long as a desired or an intended degree of refining of the microfibrillar cellulose has been achieved.

In an embodiment, the processing stage 104 may be followed by the after-treatment stage 106 into which the refined fibre material is supplied for further processing. The further processing may for example comprise one or more purification apparatus, such as a washer or a cleaner, for the purification of the refined fibre material and/or one or more screens to sort the refined fibre material into different fractions. The after-treatment stage 106 may also comprise dewatering equipment like one or more filters and/or presses.

Figure 2:
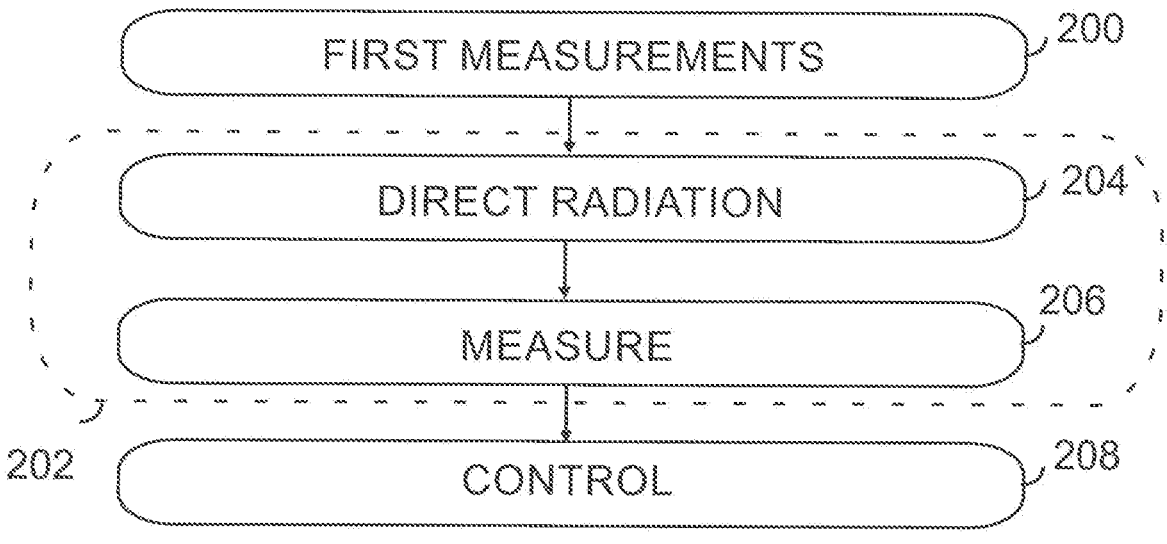
FIGS. 2, 3A and 3B are flowcharts illustrating embodi-ments.

FIG. 2 is a flowchart illustrating an embodiment. The flowchart illustrates an example of the operation of a controller controlling processing of cellulose. In an embodiment, the process is configured to produce microfibrillar cellulose.

In step 200, the controller is configured to perform first measurements of the cellulose during the processing.

In step 202, the controller is configured to perform second measurements of the cellulose.

For performing the second measurements the controller may be configured to, direct in step 204, optical radiation to the cellulose, the radiation comprising at least one beam that is polarized and at least one separate beam is non-polarized and measure, in step 206, attenuations and parameters of polarization of the radiation interacted with the cellulose; and determining size of particles in the cellulose based on at least one comparison of the parameters of polarization and the attenuations In step 208, the controller is configured to control the processing of cellulose based on the first measurements until a given threshold of the first measurements has been reached and thereafter controlling the processing based on the second measurements.

In an embodiment, when the cellulose is processed mechanically by refining the cellulose in a refiner between a set of refiner segments, the processing may be controlled by adjusting the gap between the refiner segments, the time of process or revolutions per minute (RPM) of refiner segments. Decreasing the gap between refiner segments provides smaller particles. Decreasing the gap also increases the energy consumption. Similarly increasing the revolutions per second with refiner segments provides smaller particles and increases the energy consumption. The adjustment of the gap between refiner segments also provides possibility to provide fines with designed quality.

In an embodiment, when the cellulose is processed chemically, the processing may be controlled by adjusting the amount and type of chemicals and/or enzymes used in the process, the temperature and time used in the processing. One exemplary enzyme is endoglucanase which disperses the fibrils and adding the enzyme portion would provide smaller particles. Another example of chemical processing method is Tempo-oxidation where the oxidation disintegrates the internal bonds of fibres and provides the nanocrystals from the cellulosic material. Increasing the Tempo-oxidation chemical increases the amount of gained nanocrystals.

In an embodiment, when the cellulose is processed with micro fluidizer, the processing may be controlled by adjusting the pressure of the micro fluidizer. The bigger the pressure the smaller particles are generated. Adding pressure requires more energy.

In an embodiment, when the cellulose is processed with homogenizer, the processing may be controlled by adjusting the pressure of the fluid. The bigger the pressure the smaller particles are generated. Adding pressure requires more energy.

In an embodiment, when the cellulose is processed with disperser, the processing may be controlled by adjusting the gap between the disperser segments, the time of process or revolutions per minute of refiner segments. Decreasing the gap between disperser elements provides smaller particles. Decreasing the gap also increases the energy consumption. Similarly increasing the revolutions per second with disperser provides smaller particles and increases the energy consumption. The adjustment of the gap between disperser elements also provides possibility to provide fines with designed quality.

In an embodiment the processing method and control target changes between first measurement phase and second measurement phase. For example, in the first measurement phase the refiner is controlled to keep certain gap between refiner elements and certain RPM. When proceeding to the second measurement phase the refiner gap between refiner elements may be decreased and RPM in is also decreased. After this the control of the process may be done by decreasing the gap between refiner elements and keeping the RPM the same, or vice versa. Thus, during the second measurement phase the control method may be different compared to the first measurement phase. Another way is to use chemical control on the first measurement phase and refiner segment gap control in the second measurement phase. Any other combination of processing and control is also applicable. For example, in the first measurement phase there may be refiner type of processing and respective control and in the second measurement phase chemical processing and respective control.

The proposed new measurement solution enables the production of more homogenous product than in the prior art. In an embodiment, the obtained size of particles may be smaller than in prior art. The proposed solution consumes less energy per produced tonnage of end product having desired properties. In refiners the wearing of refiner segments may be minimized. Likewise, in chemical solutions the amount of chemicals may be minimised.

For example, liquid containers made by cardboard may comprise several types of layers having different properties, although all layers may comprise MFC type of materials. For example, outer and the inner layers of a liquid container may utilise MFC material with small particle size but with some larger particles. Between the outer and the inner layers there may be a flow barrier layer which prevents the liquid leaking outside the container. The flow barrier layer may utilise homogenous MFC material with small particle size with no larger particles.

In an embodiment, the cellulose process manufacturing MFC may be controlled in such a manner, that the process is terminated when the particle size obtained using the process has reached a given threshold. This reduces the energy consumption of the process compared to prior art solutions, where the process is kept on going for a given time just to ensure that the particle size is satisfactory, because measurements of the size of the particles could not be performed.

Figure 3A:
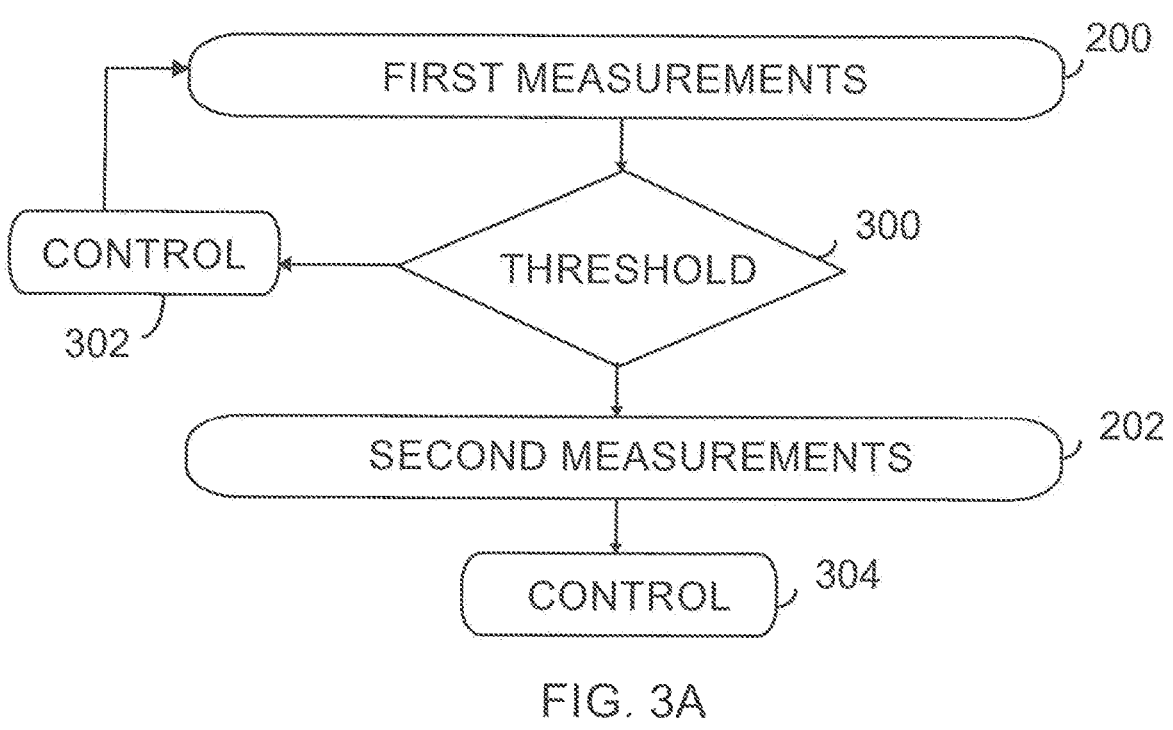

FIG. 3A is a flowchart illustrating an embodiment. The flowchart illustrates an example of the operation of a controller controlling processing of cellulose. In an embodiment, the process is configured to produce microfibrillar cellulose.

In step 200, the controller is configured to perform first measurements of the cellulose during the processing.

In step 300, the controller is configured to determine whether a given threshold of the first measurements has been reached.

If not, the controller is configured to in step 302, control the processing of cellulose based on the first measurements.

If yes, the controller is configured to, in step 202, the controller is configured to start performing second measurements of the cellulose.

In step 304, control the processing of cellulose based on the second measurements.

In the above example embodiment, second measurements are performed only when needed.

Figure 3B:
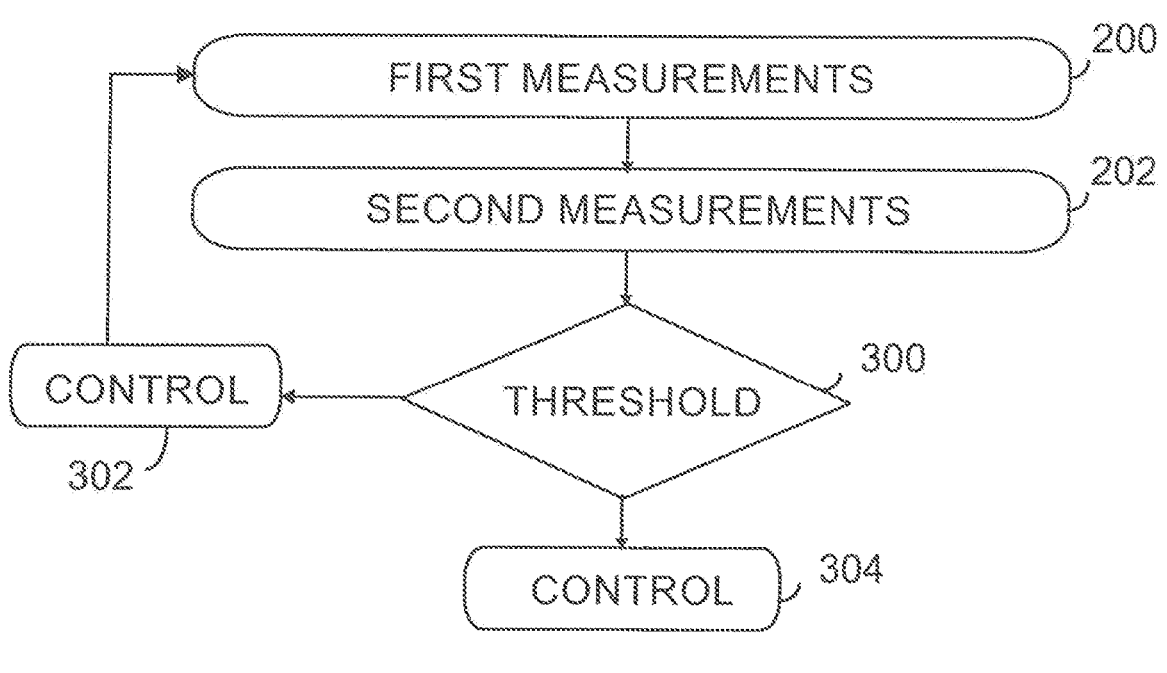

FIG. 3B is a flowchart illustrating an embodiment. The flowchart illustrates an example of the operation of a controller controlling processing of cellulose. In an embodiment, the process is configured to produce microfibrillar cellulose.

In step 200, the controller is configured to perform first measurements of the cellulose during the processing.

In step 202, the controller is configured to perform second measurements of the cellulose.

In step 300, the controller is configured to determine whether a given threshold of the first measurements has been reached.

If not, the controller is configured to in step 302, control the processing of cellulose based on the first measurements.

If yes, the controller is configured to in step 304, control the processing of cellulose based on the second measurements.

In the above example embodiment, first and second measurements are performed concurrently.

In an embodiment, performing the first measurements comprises measuring drainability of the cellulose during the processing and monitoring the variation of drainage measurements. In an embodiment, the given threshold is reached when variation of the drainage is below a given threshold.

In an embodiment, performing the first measurements comprises measuring optically the size of particles in the cellulose during the processing and the given threshold is reached when the size of particles corresponds to the resolution of the optical measurement.

The most known methods of measuring drainability include CSF (Canadian Standard Freeness) and the Schopper-Riegler method, which are known per se. Often in drainability measurements, the sample is filtered through a wire to a funnel having a constant flow valve and a side branch. The amount of water discharged from the side branch is measured, and this amount of water corresponds to drainability.

In an embodiment, performing the first measurements comprises following. A sample is taken of cellulose being processed. Optical radiation is targeted to the sample and an image is captured with digital camera from the sample. The properties of the image is measured with software for determining the cellulose particles in the image. The size of different particles is measured. Technology for this is known per se. The imaging technology has a certain threshold after distinguishing separate smaller particles is not anymore possible. This threshold is dependent on used optical radiation, optics and resolution of imaging cell of the camera. This threshold also determines the resolution for image based optical measurement.

As such, the first measurements can be made according to known methods and there is no need to describe the measurements in detail.

Figure 4A:
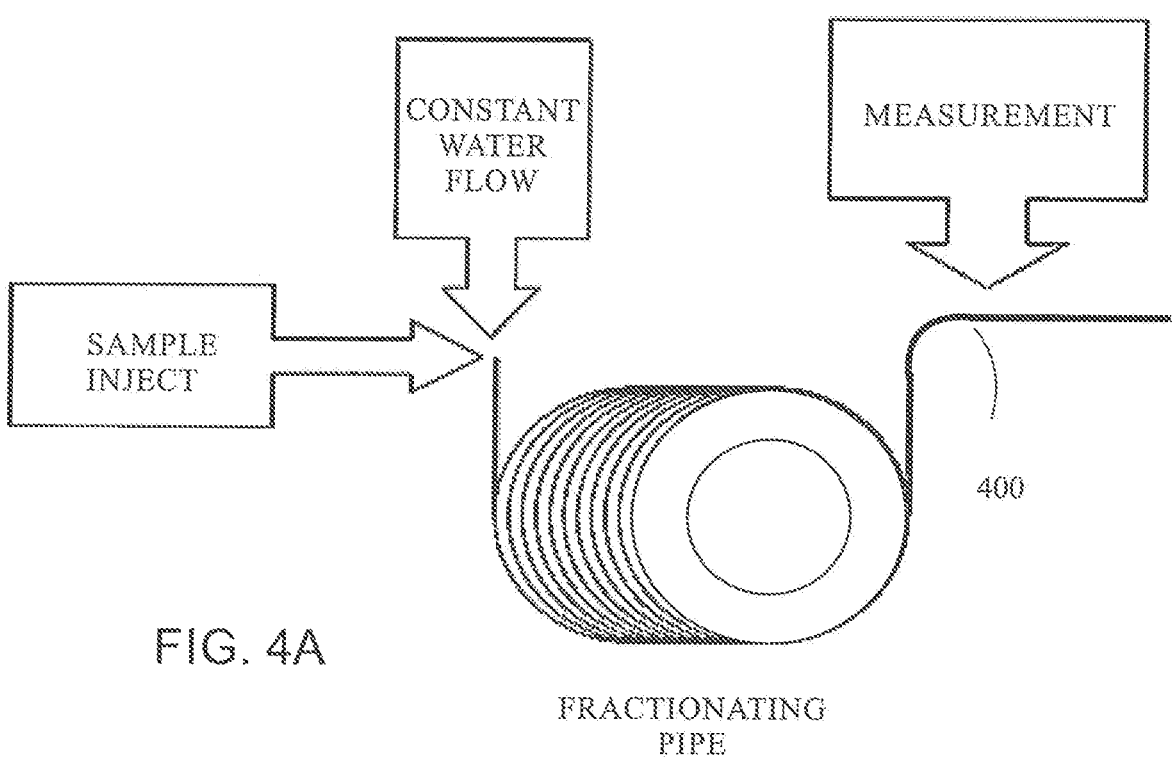
FIG. 4A illustrates an example of principle of fraction-ation.

FIG. 4A illustrates one example of the second measurement. In this example, measurement involves three steps: sample dosing, sample separation and sample measurement. In dosing, the sample is dosed into a fractionating tube 400; in separation, the sample is pushed in a fluid flow through the fractionating tube 400, whereby the sample is divided into different fractions. In the measurement step, the sample divided during separation is measured as a function of time and/or flow rate. However, other kind of fractionation may also be used.

In an embodiment, the second measurements utilize optical measurement that is based on measuring the attenuation of light on two different wavelengths and reversing the polarization level in the wavelength of visible light. Light attenuation is designated here by abbreviations AVis and ANir. Attenuation AVis describes attenuation occurring in the visible wavelength range and ANir describes attenuation occurring in the near infrared wavelength range. Abbreviation DVis describes the reversal of polarization occurring in the visible wavelength range.

Attenuation coefficient (Attn Coeff, AVis, ANir) describes the quantity of attenuation in light intensity as light travels in a medium. Attenuation may also be called absorbance. Two mechanisms affect the attenuation of light: light absorption and scattering. Absorption refers to the absorption of light energy into matter and scattering refers here to the change in the direction of light when encountering solid matter in a fluid.

Figure 4B:
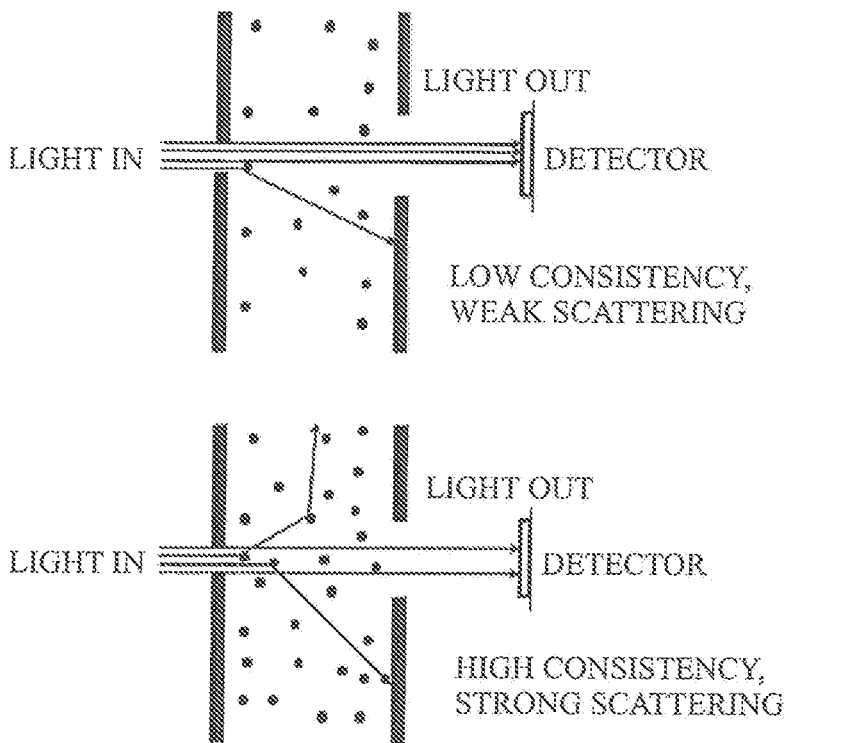
FIG. 4B illustrates an example of attenuation of intensity caused by scattering.

FIG. 4B illustrates example of attenuation of intensity caused by scattering. The intensity of light can be measured using the detector 704 and the attenuation can be determined using the data processing unit 706 (see FIG. 7A). A lower consistency causes a weaker scattering than a higher consistency. In consistency (i.e. concentration) measurements, attenuation is caused mainly by the increase in light scattering as a function of consistency; an example of the principle of this effect is shown in FIG. 4B. Wood fibers and other particles being positioned on the light path deflect part of the light from its original direction, and the light intensity at the detector decreases as a result. The higher the consistency, the more scattering particles there are on the light path and the more the intensity decreases.

Intensity decreases logarithmically in relation to consistency. The quantity of attenuation is calculated as the relation between the measurement intensity and the intensity of water measurement. In an embodiment, calculation of an AVis signal is as follows:

$$AVis = \ln\left(\frac{IntAVis(\text{Sample})}{IntAVis(\text{Water})}\right) \tag{1}$$

where IntAVis(Sample)=measurement value of AVis measured through sample, and IntAvis(Water)=measurement value of AVis measured through water. IntAVis(Sample) and IntAvis(Water) can be measured by the detector 704, and AVis can be determined by the data processing unit 706 (see FIGS. 7A, 7B).

Equivalently, calculation of an ANir signal is as follows:

$$ANir = \ln\left(\frac{IntANir(\text{Sample})}{IntANir(\text{Water})}\right) \tag{2}$$

where IntANir(Sample)=measurement value of ANir measured through sample, and IntANir(Water)=measurement value of ANir measured through water. IntANir(Sample) and IntANir(Water) can be measured by the detector 702, and ANir can be determined by the data processing unit 706 (see FIGS. 7A, 7B).

A fibrous index can be defined in a following manner. In fiber measurements, one potential signal describing sample properties is the ratio between the depolarization signal and the attenuation measurement. This ratio depicts the fibrousness of the sample and this ratio is referred to as a fibrous index (FI).

$$\text{Fibrous Index} = FI = \frac{DVis}{AVis} - DVis_{water} \tag{3}$$

Figures 7A, 7B, 7C, 7D:
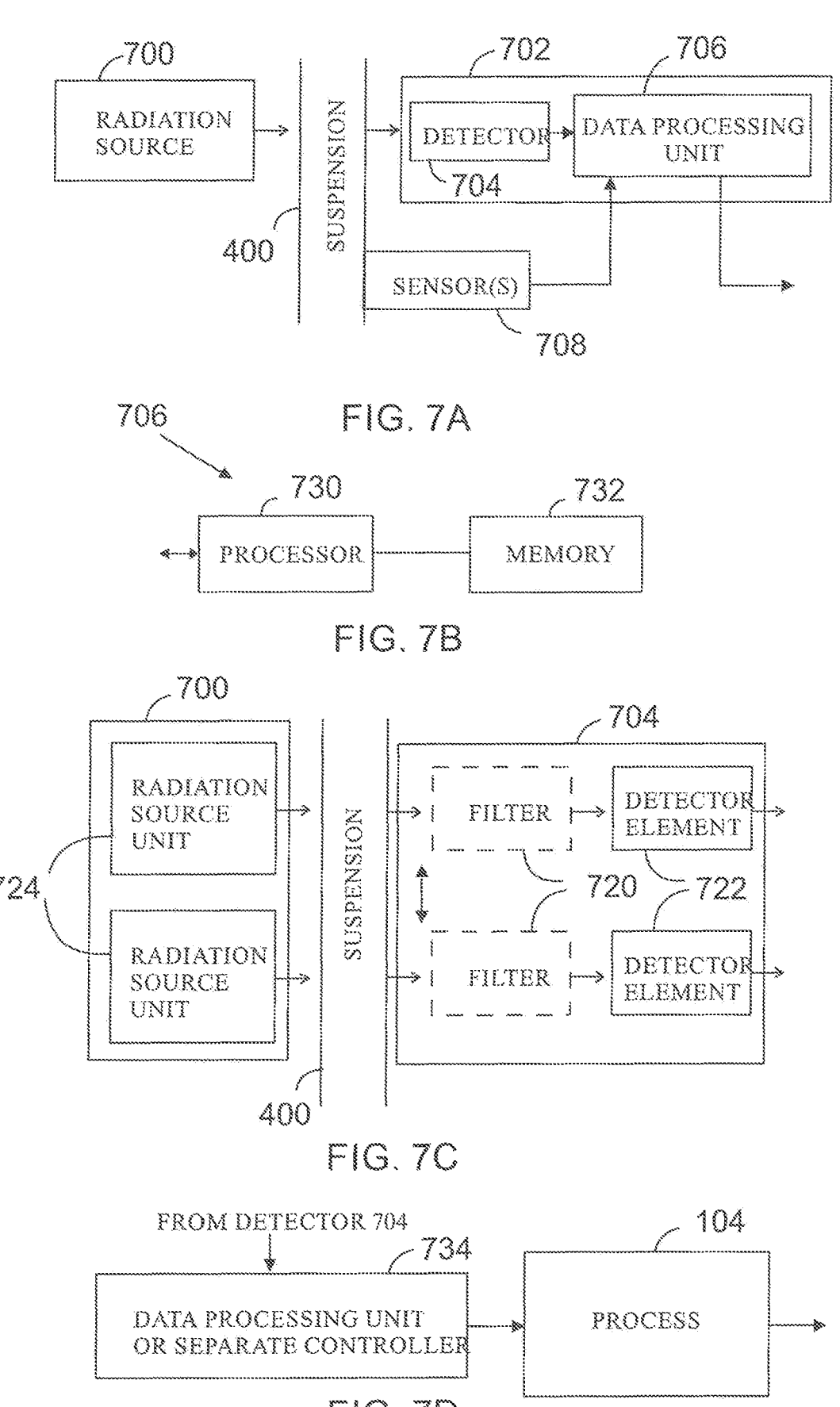
FIG. 7A illustrates an example of an apparatus for mea-suring.
FIG. 7B illustrates an example of a data processing unit.
FIG. 7C illustrates an example of a general measurement configuration of the measurement apparatus.
FIG. 7D illustrates an example of a control arrangement.

In an embodiment, the fibrous index FI can be formed by the data processing unit 706 (see FIGS. 7A and 7B).

A water value $DVis_{water}$ may be deducted from the depolarization signal, thus providing the ratio starting from zero.

With pure and unbroken fibers, the depolarization is strong and attenuation low, whereby the ratio is high. With fines and fillers, the signals behave vice versa, whereby the ratio is low.

Another new term size index can also be defined as explained below. A short and long wavelength attenuation coefficient ratio is utilized here as a second index describing the properties. It depicts particle dimensions, such as particle size or fiber width or fiber-wall thickness. This attenuation coefficient ratio can be called the size index (SI).

The ratio of the attenuation coefficients of short and long wavelengths describes particle size.

$$\text{Size Index} = SI = \frac{ANir}{AVis} \tag{4}$$

where ANir depicts long wavelength and AVis depicts short wavelength. The ANir may include a band of the near-infrared region, and the AVis may include a band of a visible light. In an embodiment, the size index SI can be formed by the data processing unit 706 (see FIGS. 7A and 7B). The visible light may range from about 400 nm to about 700 nm. The near infrared region may range from 700 nm to 1400 nm.

A variable conversely describing the size index may obtained by dividing the short-wavelength attenuation coefficient by the equivalent long-wavelength attenuation coefficient or vice versa. Instead of the attenuation coefficient, it may also be possible to use other measured variables that react to changes in light intensity. In general, a function of a first wavelength attenuation coefficient and a second wavelength attenuation coefficient may be formed, where the first wavelength and the second wavelength are different wavelengths.

In addition to particle size and shape, attenuation occurring at different wavelengths is affected by the spectral refractive indices of particles and fluid.

When calculating the fibrous index, the depolarization signal and the attenuation signal may be measured on any wavelength of electromagnetic radiation, and there is no need for them to be on the same wavelength.

When calculating the size index, it is possible to use the wavelengths of electromagnetic radiation widely. Extremely short wavelengths, e.g. the ultraviolet range, react most sensitively to small particles. Similar to calculation of the fibrous index, calculation of the size index may also utilize several different measurement signals, of which, a measured variable describing the particle size is produced by means of the calculation method.

The size index measurements may also react to the presence of dissolved material in the fluid.

In addition to a variable describing the quantity, the proposed calculation method for fractions also requires a variable describing the particle properties which in this step is the ratio between two different signals. The change in ratio describes the change in particle properties during fractionation. Although the properties of the particles, per se, do not chance, the flow of the suspension causes the particles to be sorted into various size classes, which travel in the flow one after another. That is, the particles travel in fractions within the flow. It is also possible to use more than two basic signals in the calculation, with which signals, it is possible to calculate more complex models to describe the properties of flowing material. The models do not need to be proportional but may be produced by any function describing a desired property.

Furthermore, there is no need for the signals to be optical, but as other measurement technologies may also produce variables that describe properties.

Figure 5:
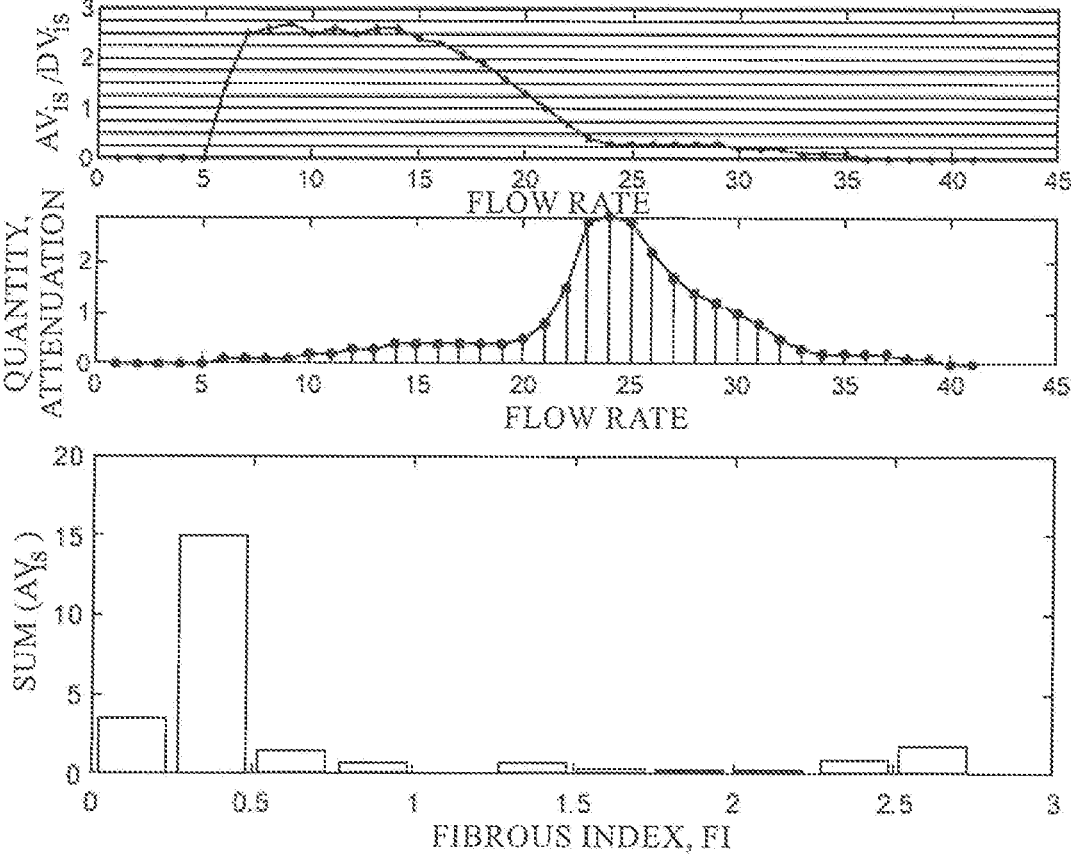
FIG. 5 illustrates an embodiment of utilizing the second measurements.

FIG. 5 illustrates an embodiment of utilizing the second measurements. In the example figure, the fibrous index (DVis/AVis) describing fibrousness produces a fibrous distribution which may be used to depict how much material corresponding to each fibrous index the material being measured contained. The distribution is produced by classifying each measurement point measured in relation to the flow based on the fibrous index and by calculating the total sum of the quantity signal values corresponding each fibrous class.

In the example, the quantity graph is the attenuation of visible wavelength AVis which is the middle graph in the figures. The lowest graph is the fibrous index distribution produced based on the property and quantity graphs.

In FIG. 5, the x-axis in the highest graph is the flow rate and the y-axis is the ratio of signals DVis/Avis. The x-axis in the graph in the middle is the flow rate, and the y-axis is the quantity and/or attenuation of the optical signal. The x-axis in the lowest graph is the fibrous index FI and the y-axis is the sum over signal AVis.

When the whole fractogram is classified in this way, an example of the completed distribution may be obtained. In this example, the low values of the fibrous index thus correspond the quantity of non-fibrous particles and the high value the quantity of fibrous particles. Material having a high fibrous index is usually pure, non-fibrillated fiber. The fibers in the medium range may be e.g. material that has partially retained its fibrousness but been pulverized and fibrillated. The lowest fibrous class contains fines and particularly material that does not include polarization-inducing pulp.

The attenuation response of the visible wavelength range used in the example is different for particles having different fibrous indices. Due to this, the fines and fillers produce a different response in relation to pulp quantity from pure fibers. The fines and fillers may produce a stronger response as attenuation, for example in relation to pulp quantity than pure fibers. This may be considered by calibrating the quantity signal such that a smaller weighting coefficient is given to the quantity measurement in the lower fibrous index range than with higher fibrous indices. The calibration may be performed by measuring particles of known properties and known contents.

In an embodiment, the fibrous index (FI) and size index (SI), which may be obtained based on the second measurements, may be utilized as a measure of the particle size in the processing of cellulose. For example, as the determined fibrous index gets a smaller value, it denotes a smaller particle size.

In an embodiment, a correlation between the fibrous index (FI) and/or size index (SI) and the particle size may be determined.

FIGS. 6A, 6B, 6C and 6D illustrate embodiments of performing measurements.

Figure 6A:
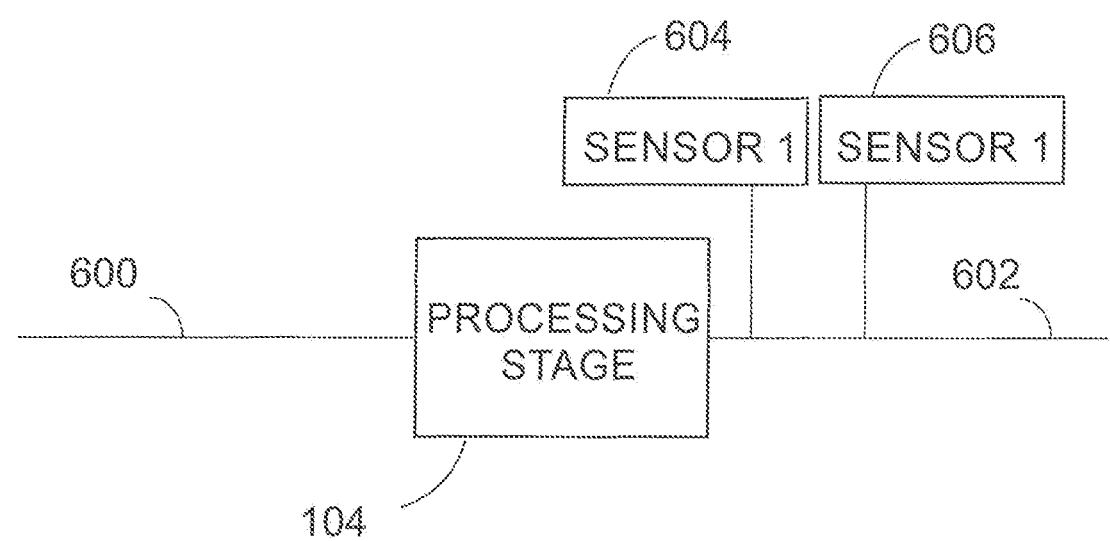
FIGS. 6A, 6B, 6C and 6D illustrate examples of the performing measurements.

In the example of FIG. 6A, the processing stage 104 receives 600 cellulose to be refined for example from a pre-treatment stage. The output 602 of the processing stage 104 is measured by a first arrangement 604 configured to perform first measurements and a second arrangement 606 configured to perform second measurements.

Figure 6B:
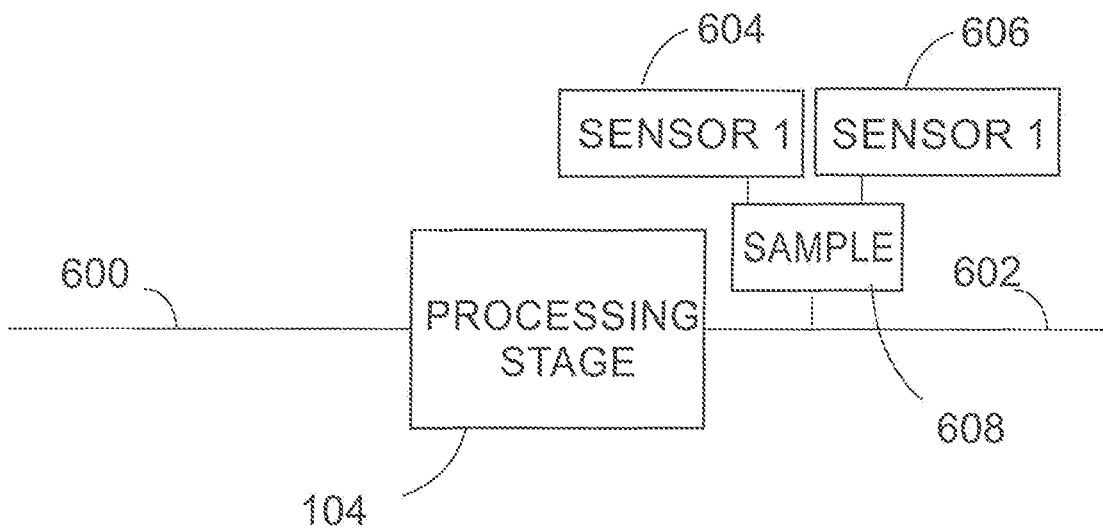

In the example of FIG. 6B, the processing stage 104 receives 600 cellulose to be refined for example from a pre-treatment stage. The output 602 of the processing stage 104 is sampled by one or more sampler 608. The first arrangement 604 is configured to perform first measurements from the sample collected by the one or more sampler 608. Likewise, the second arrangement 606 configured to perform second measurements from the sample collected by the one or more sampler 608. The first and second arrangements may utilise the same sample or different samples.

Figure 6C:
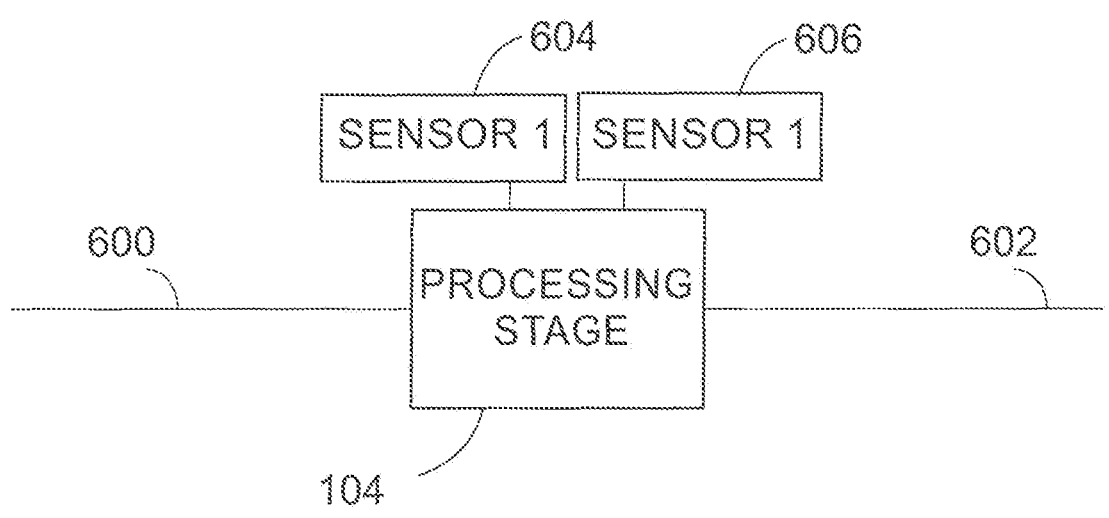

In the example of FIG. 6C, the processing stage 104 receives 600 cellulose to be refined for example from a pre-treatment stage. The first arrangement 604 configured to perform first measurements and the second arrangement 606 configured to perform second measurements from the cellulose inside the processing stage 104.

Figure 6D:
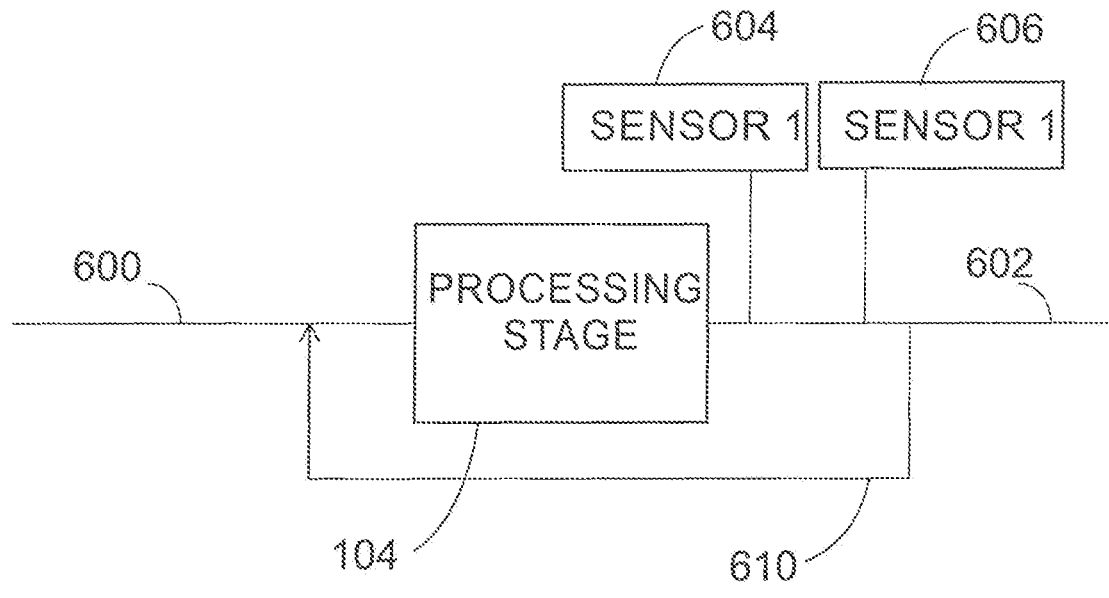

In the example of FIG. 6D, the processing stage 104 receives 600 cellulose to be refined for example from a pre-treatment stage. The output 602 of the processing stage 104 is measured by a first arrangement 604 configured to perform first measurements and a second arrangement 606 configured to perform second measurements. In this example there is a feedback 610 from the output 602 of the processing stage 104 to the input of the processing stage 104. The refiner stage may process the cellulose more than once as described earlier.

In an embodiment, there may be more than one processing stages in series. In an embodiment, the processing stages may be operated in batch-mode, where cellulose is released to the following stage through a valve, for example, or the process may be continuous where the cellulose flows through stages in an continuous manner.

FIG. 7 illustrates an example of an apparatus for performing the second measurements. The apparatus comprises a radiation source 700 that directs wave motion to the flowing suspension in the fractionating tube 400 or in tube after the fractionating tube where the fractions are ready. The wave motion may be electromagnetic radiation or acoustic radiation, for example. The flow of the flowing suspension has caused particles of the flowing suspension to be sorted on the basis of their size.

Although FIG. 7 shows that the wave motion passes through the flowing suspension, it is also possible to receive the wave motion in a direction the deviates from the direction of the transmission or the wave motion.

A measuring arrangement 702 comprises a detector 704. The detector 704 may be a semiconductor detector, for example. In an embodiment, when the wave motion is optical radiation, the detector 704 may comprise at least one photosensor or a spectrometer, for example. In an embodiment, when the wave motion is acoustic radiation, the detector 704 may comprise at least one acoustic transducer, for example. The detector 704 may measure first values of a first parameter of the wave motion at a first wavelength band of the wave motion, and second values of the wave motion interacted with the flowing suspension at a second wavelength band of the wave motion, for example. In this case, the parameter is common to both of the values because it is a question of attenuation of the wave motion, but the values are based on different wavelengths. Alternatively, the second values may be of a second parameter of the wave motion interacted with the flowing suspension, which is different from the first parameter. The parameters may relate to attenuation and polarization, for example. The measurement of the first values and the second values are performed in a synchronized manner or the measured results are synchronized in a data processing unit 706 of the measuring arrangement 702. The synchronization may mean that the values compared with each other are measured at the same moment from the same sample. If the measurements of the compared values are performed at different moments, the synchronization means that same sample is measured at a first moment and, after the sample has travelled a distance, the sample is measured at a second moment. Here the expression at the same moment may also mean that the measurement of the compared values may be performed at different moments but the temporal difference between the measurements is so small that the sample they measure is the same within a tolerance. That is, the sample has moved so little that the effect of the movement to the measurement value(s) is smaller than or equal to noise or a desired measurement tolerance. Alternatively, the detector 704 may travel with respect to the sample the distance between the measurements of the compared values.

For wavelength-based attenuation measurements, the detector 704 may have filters 720 for passing a suitable wavelength band to the detector 704. In an embodiment an example of which is illustrated in FIG. 7C, the detector 704 has a detector element 722 for each wavelength band measured. In an embodiment, the detector 704 has one detector element and filters temporarily locate in front of the detector element for measuring the first and second values. That is, the filters may move to and from a detector element.

In an embodiment, the radiation source 700 may transmit two different wavelength bands simultaneously or temporally successively. Then the detector 704 may be used without the above-mentioned filters. The radiation source 700 may have one or more radiation source units 724 for outputting the wavy motion in one or more wavelengths.

A person skilled in the art is familiar with measurements of attenuation of wavelength bands, per se. That is why FIG. 7C is a general overview of several possibilities.

For polarization measurement, the detector 704 may have one or more polarization filters in front of the detector 704. For this example, filters 720 in FIG. 7C can be considered the polarization filters. Turning of the polarization or degree of the polarization may be measured with one or more detector elements 722 of the detector 704. At the moment of measurement(s), the suspension may flow or it may be still or in a non-flowing state.

The at least one sensor 708 may measure consistency, temperature and/or flow (speed/rate), for example. The sensor 708 may be a semiconductor sensor. A person skilled in the art is familiar with various sensors 708, per se. Additionally, there may be a clock for measuring time.

The data processing unit 706 may be configured to form at least one comparison, each comparison being configured to relate to one of the first values and one of the second values, for example to the parameters of polarization and the attenuations. This comparison may be based on equations (1)-(4), for example.

The measurements of the first and second values that are compared may be performed at the same moment or at successive moments. Different wavelengths may be detected at the same moment using two or more detector elements or a common detector element may receive different wavelengths successively through different filters, each of the filters being configured to filter the incoming wave motion at successive moments. That is, the filters may change one by one in front of the detector 704 as a function of time. Filters are, however, not necessary if the radiation source 700 outputs different wavelengths as a function of time.

FIG. 7B illustrates an example of the data processing unit 706, which may comprise one or more processors 730 and one or more memories 732 including a suitable computer program code. The one or more memories 732 and the computer program code may, with the one or more processors 730, cause the data processing unit 706 to perform the steps of second measurements described in this document.

FIG. 7D illustrates an example of a control arrangement. The process control apparatus 734 may be the data processing unit 706 or a separate controller, which may comprise, like the data processing unit 706, one or more processors and one or more memories including a suitable computer program code. The process control apparatus 734 control the processing stage 104 based on the determined size of particles in the cellulose based on comparison being configured to relate to one of the first values and one of the second values, for example to the parameters of polarization and the attenuations.

Embodiments of the presented measurement method may be implemented as a logic circuit solution or computer program. Correspondingly, the process control may utilize the measured information of the control of the process may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. A method for controlling cellulose processing, characterized by
    performing first measurements of the cellulose during the processing, including:
        measuring drainability of the cellulose during the processing and monitoring a variation of drainage measurements, or
        measuring optically a size of particles in the cellulose during the processing;
    performing second measurements of the cellulose, including:
        first, directing optical radiation to the cellulose, the radiation comprising at least one beam that is polarized and at least one separate beam is non-polarized;
        second, measuring attenuations and parameters of polarization of the radiation interacted with the cellulose; and determining the size of particles in the cellulose based on at least one comparison of the parameters of polarization and the attenuations; and
        controlling the processing based on the first measurements until a given threshold of the first measurements, including the variation of drainage measurements or a predetermined size of the particles, has been reached and thereafter controlling the processing based on the second measurements.

2. The method of claim 1, wherein the cellulose is processed mechanically by refining the cellulose in a refiner between a set of refiner segments and the processing is controlled by adjusting a gap between the refiner segments and/or a time of process and/or revolutions per minute of the refiner segments.

3. The method of claim 1, wherein the cellulose is processed chemically, and the processing is controlled by adjusting an amount and type of chemicals and/or enzymes used in the process and/or a temperature and/or time used in the processing.

4. The method of claim 1, wherein the cellulose is processed with micro fluidizer and the processing is controlled by adjusting a pressure of the micro fluidizer.

5. The method of claim 1, wherein the cellulose is processed with homogenizer and the processing is controlled by adjusting a pressure of a fluid.

6. The method of claim 1, wherein the cellulose is processed with a disperser, and the processing is controlled by adjusting a gap between a disperser segments and/or a time of process or revolutions per minute of a segments.

7. The method of claim 1, the second measurements comprising:
    taking a sample of cellulose being processed;
    directing wave motion to the sample, a flow of the sample causing particles in the sample to be sorted on the basis of their sizes;
    directing optical radiation to the sample, the radiation comprising at least one beam that is polarized or a plurality of beams at least one of which is polarized and at least one separate beam is non-polarized;
    measuring attenuations of an electromagnetic radiation interacted with a flowing suspension;
    measuring parameters of polarization of the electromagnetic radiation interacted with the suspension; the measurements of attenuations and the parameters of polarization being synchronized;
    forming the at least one comparison of the parameters of polarization and the attenuations, each of the parameters and each of the attenuations of a comparison corresponding to each other on the basis of synchronization, the comparison depending on physical properties of the particles of the flowing suspension.

8. The method of claim 1, the first measurements comprising: measuring drainability of the cellulose during the processing and monitoring the variation of drainage measurements and the given threshold is reached when variation of the drainage is below a given threshold.

9. The method of claim 1, the first measurements comprising: measuring optically the size of particles in the cellulose during the processing and the given threshold is reached when the size of particles corresponds to a resolution of an optical measurement.

10. The method of claim 1, further comprising:
    performing first measurements until a given threshold of an optical measurements has been reached; thereafter performing second measurements.

11. The method of claim 1, wherein the given threshold is reached when variation of the drainage is below a predetermined threshold.

12. The method of claim 1, wherein the given threshold is reached when the size of particles corresponds to the resolution of the optical measurement.

* * * * *